(12) United States Patent
Cheng et al.

(10) Patent No.: US 10,719,092 B2
(45) Date of Patent: Jul. 21, 2020

(54) BUILDING ENERGY MODELING TOOL SYSTEMS AND METHODS

(71) Applicant: CURRENT LIGHTING SOLUTIONS, LLC, East Cleveland, OH (US)

(72) Inventors: Na Cheng, San Ramon, CA (US); Paul Cox, San Ramon, CA (US)

(73) Assignee: Current Lighting Solutions, LLC, East Cleveland, OH (US)

( * ) Notice: Subject to any disclaimer, the term of this patent is extended or adjusted under 35 U.S.C. 154(b) by 0 days.

(21) Appl. No.: 15/823,130

(22) Filed: Nov. 27, 2017

(65) Prior Publication Data

US 2019/0163215 A1    May 30, 2019

(51) Int. Cl.
| | |
|---|---|
| *G05D 23/19* | (2006.01) |
| *G05B 15/02* | (2006.01) |
| *G05B 19/418* | (2006.01) |
| *G06Q 50/06* | (2012.01) |

(52) U.S. Cl.
CPC ......... *G05D 23/1917* (2013.01); *G05B 15/02* (2013.01); *G05B 19/41885* (2013.01); *G06Q 50/06* (2013.01); *G05B 2219/2614* (2013.01); *G05B 2219/2642* (2013.01)

(58) Field of Classification Search
CPC ................ G05D 23/1917; G05B 15/02; G05B 19/41885; G06Q 50/06
See application file for complete search history.

(56) References Cited

U.S. PATENT DOCUMENTS

| | | | | |
|---|---|---|---|---|
| 10,095,207 | B2* | 10/2018 | Ji | G05B 19/02 |
| 2013/0274940 | A1* | 10/2013 | Wei | G05B 19/02 |
| | | | | 700/291 |
| 2015/0253027 | A1* | 9/2015 | Lu | G05B 15/02 |
| | | | | 700/276 |
| 2015/0370927 | A1* | 12/2015 | Flaherty | F24D 19/1084 |
| | | | | 703/1 |
| 2017/0169344 | A1* | 6/2017 | Mangharam | G06N 5/025 |
| 2017/0230930 | A1* | 8/2017 | Frey | H04W 4/80 |
| 2018/0259989 | A1* | 9/2018 | Li | G05F 1/66 |

* cited by examiner

*Primary Examiner* — Thomas C Lee
*Assistant Examiner* — Anzuman Sharmin
(74) *Attorney, Agent, or Firm* — Buckley, Maschoff & Talwalkar LLC

(57) ABSTRACT

Example apparatus, systems and methods for cloud-based simulation and control of building systems are disclosed and described herein. An example apparatus includes a control center including a processor configured to implement a modeler to generate a model of a target building infrastructure based on weather data, usage data, and building properties information. The example processor is configured to implement a building energy simulator to simulate energy usage for the target building using the model and scenario parameters. The example simulator is to simulate a plurality of scenarios with respect to the model to determine the configuration information for the one or more facility environmental controllers at the target building. The example simulator is to calculate a value associated with each simulated scenario and facilitate comparison of the values to generate the configuration information corresponding to a selected value to be selected from the values associated with the simulated scenarios.

20 Claims, 13 Drawing Sheets

BUILDING ENERGY MODELING TOOL SYSTEMS AND METHODS

FIELD

The present disclosure generally relates to apparatus, systems, and methods for modeling and control of building systems and, more particularly, to apparatus, systems, and methods for generating controls settings for building environment systems.

BACKGROUND

Heating, ventilation, and air conditioning (HVAC) controls govern the climate inside buildings and other facilities (e.g., climate control or energy management). HVAC management involves regulation of heating systems, radiators, chimneys, ventilators, air conditioners, humidifiers, dehumidifiers, air filters, and the like. HVAC management helps a building to be operated in a safe and comfortable way for the people (and equipment) inside the building. While HVAC controls tie in to electrical systems, mechanical systems, and electromechanical systems, setting and maintenance of HVAC controls continues to be a very manual, trial-and-error based endeavor leading to delays, inaccurate results, and little or no coordination of control.

BRIEF SUMMARY

In view of the above, apparatus, systems, methods, and computer program products which improve configuration of facility environmental controls are provided. The above-mentioned needs are addressed by the subject matter described herein and will be understood in the following specification. This summary briefly describes aspects of the subject matter described below in the Detailed Description, and is not intended to be used to limit the scope of the subject matter described in the present disclosure.

Certain examples provide a cloud-based building systems management apparatus. The example apparatus includes a control center including a processor, the processor to execute instructions to configure the processor to generate configuration information for one or more facility environment controllers in communication with the cloud-based building systems management apparatus. The example processor is configured to implement at least a modeler to generate a model of a target building infrastructure based on weather data, usage data, and building properties information. The example processor is configured to implement at least a building energy simulator to simulate energy usage for the target building using the model and scenario parameters. The example simulator is to simulate a plurality of scenarios with respect to the model to determine the configuration information for the one or more facility environmental controllers at the target building. The example simulator is to calculate a value associated with each simulated scenario and facilitate comparison of the values to generate the configuration information corresponding to a selected value to be selected from the values associated with the simulated scenarios.

Certain examples provide a tangible computer-readable storage medium including instructions which, when executed, particularly program a processor in a cloud-based control center and cause the processor to generate configuration information for one or more facility environment controllers in communication with the cloud-based control center. The example processor is configured to implement at least a modeler to generate a model of a target building infrastructure based on weather data, usage data, and building properties information. The example processor is configured to implement at least a building energy simulator to simulate energy usage for the target building using the model and scenario parameters. The example simulator is to simulate a plurality of scenarios with respect to the model to determine the configuration information for the one or more facility environmental controllers at the target building. The example simulator is to calculate a value associated with each simulated scenario and facilitate comparison of the values to generate the configuration information corresponding to a selected value to be selected from the values associated with the simulated scenarios.

Certain examples provide a computer-implemented method for configuring facility environmental controllers via a cloud-based control center. The example method includes generating, using a processor, a model of a target building infrastructure based on weather data, usage data, and building properties information; and simulating, using the processor, energy usage for the target building using the model and scenario parameters. The example simulating includes simulating a plurality of scenarios with respect to the model to determine the configuration information for the one or more facility environmental controllers at the target building; calculating a value associated with each simulated scenario; and facilitating comparison of the values to generate the configuration information corresponding to a selected value to be selected from the values associated with the simulated scenarios.

Figure 1:
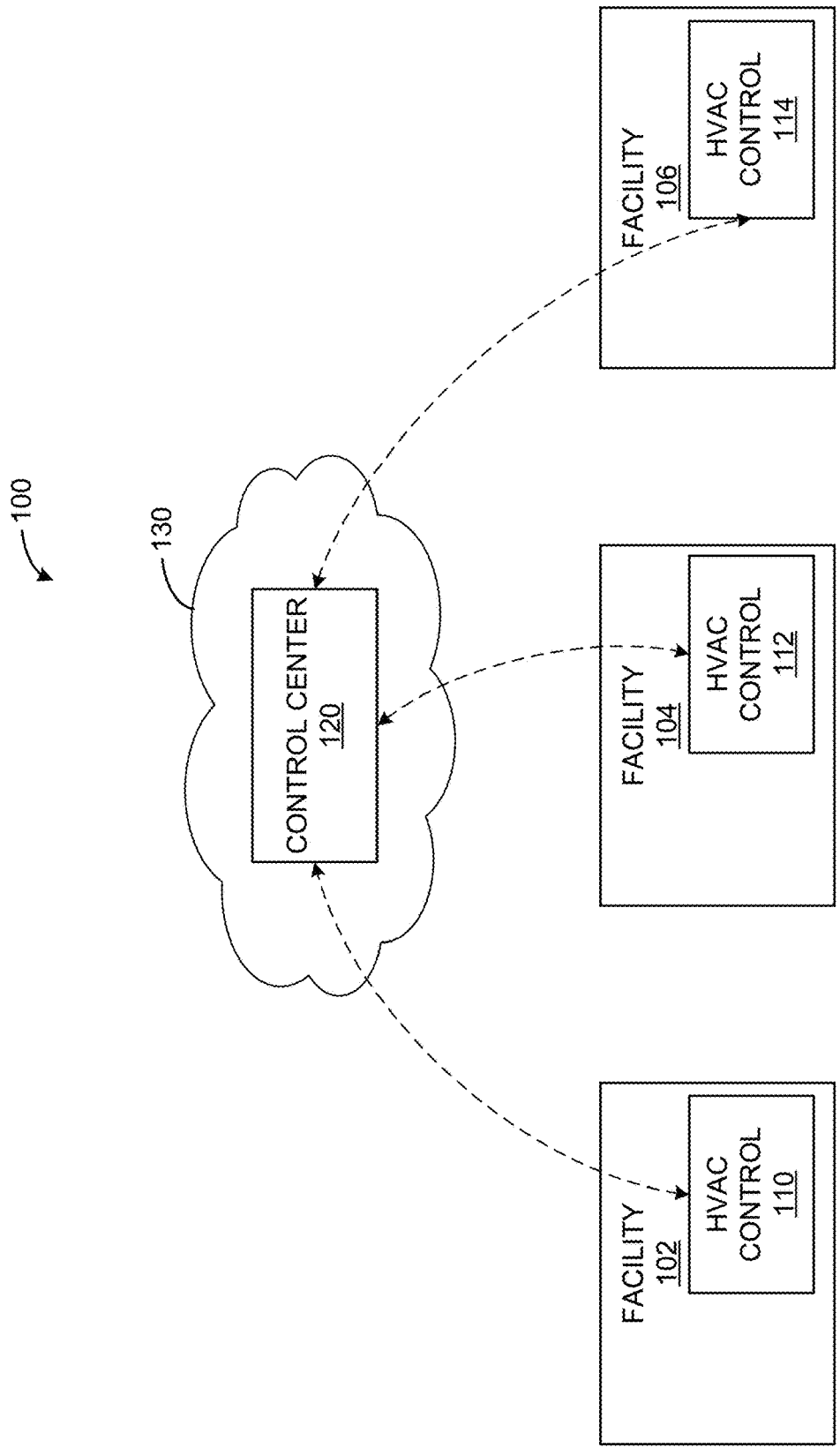
FIG. 1 illustrates an example system including heating, ventilation, and air conditioning (HVAC) control subsystems in communication with a control center in a cloud-based environment.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

In addition, it should be understood that references to "one embodiment" or "an embodiment" of the present disclosure are not intended to be interpreted as excluding the existence of additional embodiments that also incorporate the recited features.

Certain examples provide apparatus, systems, and methods for energy management. In certain examples, cloud-based apparatus, systems, and methods facilitate energy management across a plurality of sites or facilities.

An example energy management system (EMS) provides a platform to control, model, optimize, and/or otherwise configure energy management solutions such as energy conservation measures (ECMs), etc. In certain examples, an ECM saving estimation tool is built on the EMS platform to provide reliable, scalable and secure solution to customers by suggesting savings corresponding to different generated ECMs.

As shown in the example system 100 of FIG. 1, a plurality of facilities 102-106 include heating, ventilation, and air conditioning (HVAC) control subsystems 110-114 in communication with a control center 120 in a cloud-based environment 130. The HVAC control subsystems 110-114 communicate with the control center 120 to receive settings, parameters, commands, instructions, etc., and/or to provide log files, feedback, status updates, etc.

For example, temperature controls, fan controls, pressure controls, etc., can be received from the control center 120. For example, temperature controls provide limit or temperature control in one or more areas of the facility 102-106. Fan controls can adjust fan motor speed, for example. Pressure controls regulate compressor activity, oil pressure safety, condenser fan cycling, etc. Such controls can operate locally (e.g., via local control at the site 102-106, etc.) and/or remotely (e.g., centralized, scheduled, and/or otherwise programmatic control via the control center 120, etc.) to regulate operation of a heating and/or air conditioning system. In certain examples, a sensor is used to compare an observed state (e.g., a current measured temperature, pressure, etc.) with a target state (e.g., a desired or otherwise selected/specified temperature, pressure, etc.). The control center 120 and/or local HVAC control 110-114 can specify the target state, and the local HVAC control 110-114 can react to the measured difference between observed state and target state to take action to reach and/or otherwise maintain the target state (e.g., start a blower, reduce pressure, trigger a fan, heat, cool, etc.).

Figure 2:
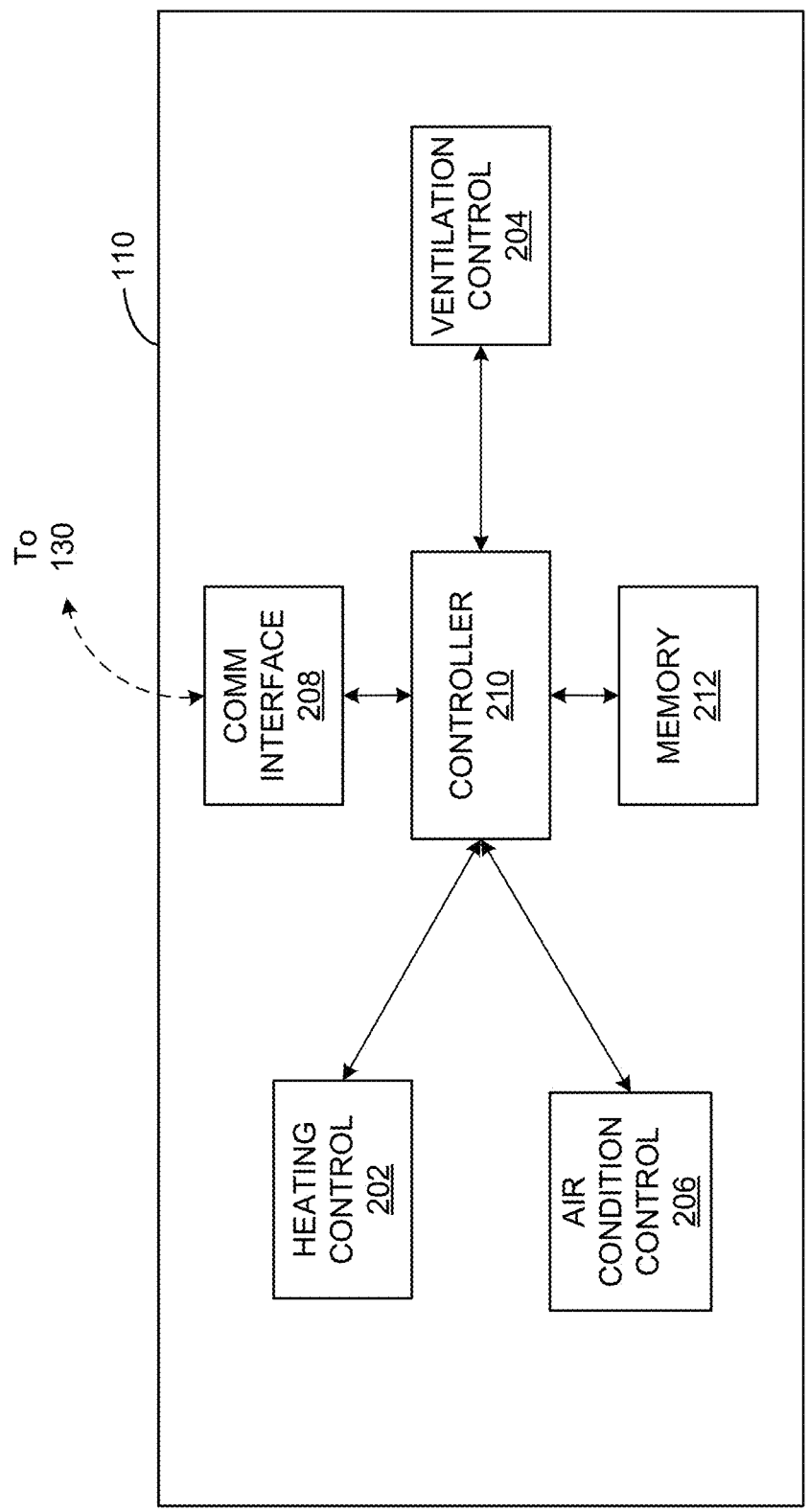
FIG. 2 shows an example implementation of the HVAC control subsystem of the example of FIG. 1.

As shown in the example of FIG. 2, an implementation of the example HVAC control subsystem 110 includes a heating control 202, a ventilation control 204, an air conditioning control 206, a communication interface 208, and a controller 210, and a memory 212. While the HVAC control subsystem 110 is shown in the example of FIG. 2, the drawing and description can also apply to subsystems 112, 114. As discussed above with respect to FIG. 1, a local action, sensor measurement, trigger, etc., can trigger action by one or more of the heating control 202, ventilation control 204, or air conditioning control 206. For example, a sensor measurement and/or selection through a touchscreen, keypad, knob, dial, button, etc., can be received through the communication interface 208 and provided to the controller 210 to trigger one or more of the heating control 202, ventilation control 204, or air conditioning control 206. Alternatively or in addition, command(s) from the control center 120 in the cloud 130 can be received via the communication interface 208 and provided to the controller 210 to trigger one or more of the heating control 202, ventilation control 204, or air conditioning control 206, for example. Commands, settings, logs, etc., can be stored in the memory 212 for use by the controller 210, heating control 202, ventilation control 204, and/or air conditioning control 206, for example.

Figure 3:
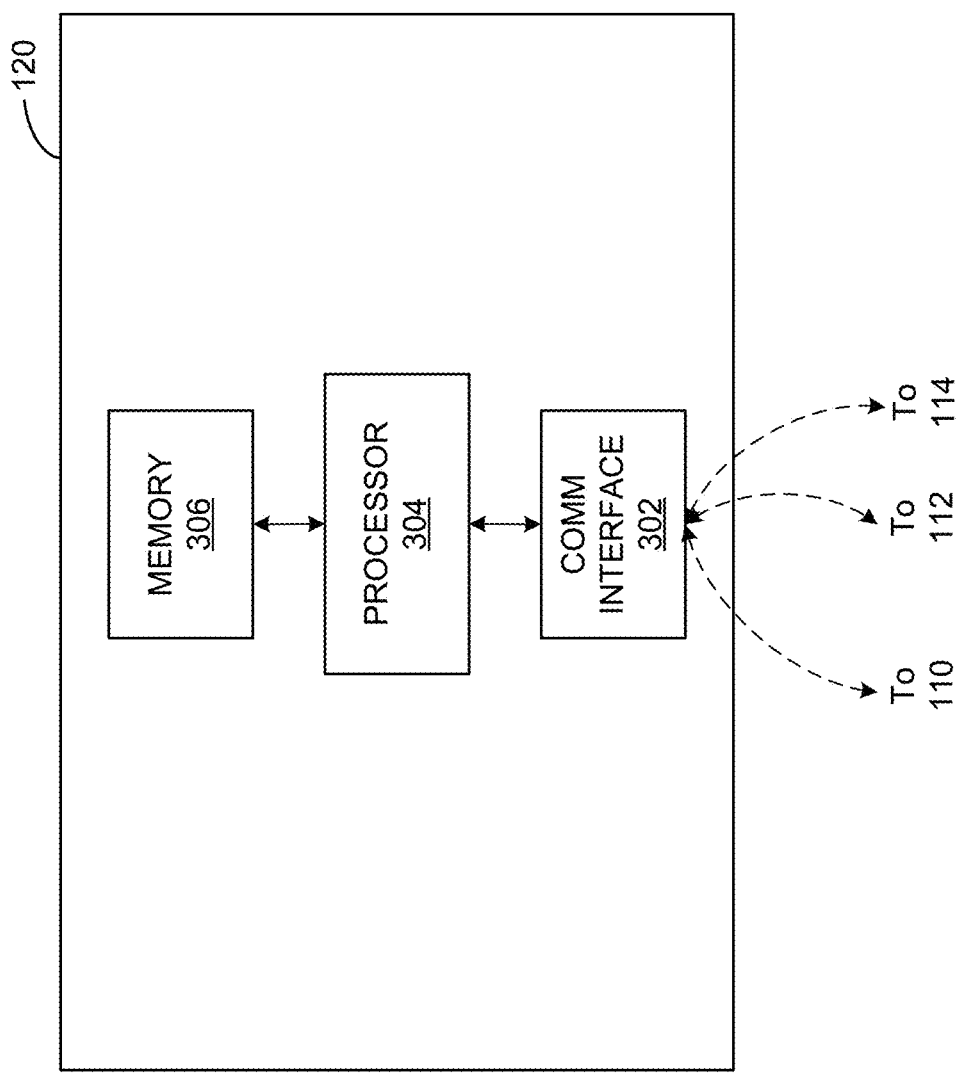
FIG. 3 shows an example implementation of the control center of the example of FIG. 1.

As shown in the example of FIG. 3, an implementation of the example control center 120 includes a communication interface 302, a processor 304, and a memory 306. The communication interface 302 (e.g., a wireless communication interface such as cellular, Wi-Fi, and/or other mobile communication interface) sends instructions and receives feedback from external devices such as the HVAC controls 110-114. The memory 306 stores instructions, data, logs, programs, etc., to enable the processor 304 to instruct, trigger, and/or otherwise control the HVAC controls 110-114 for each facility 102-106.

Figure 4:
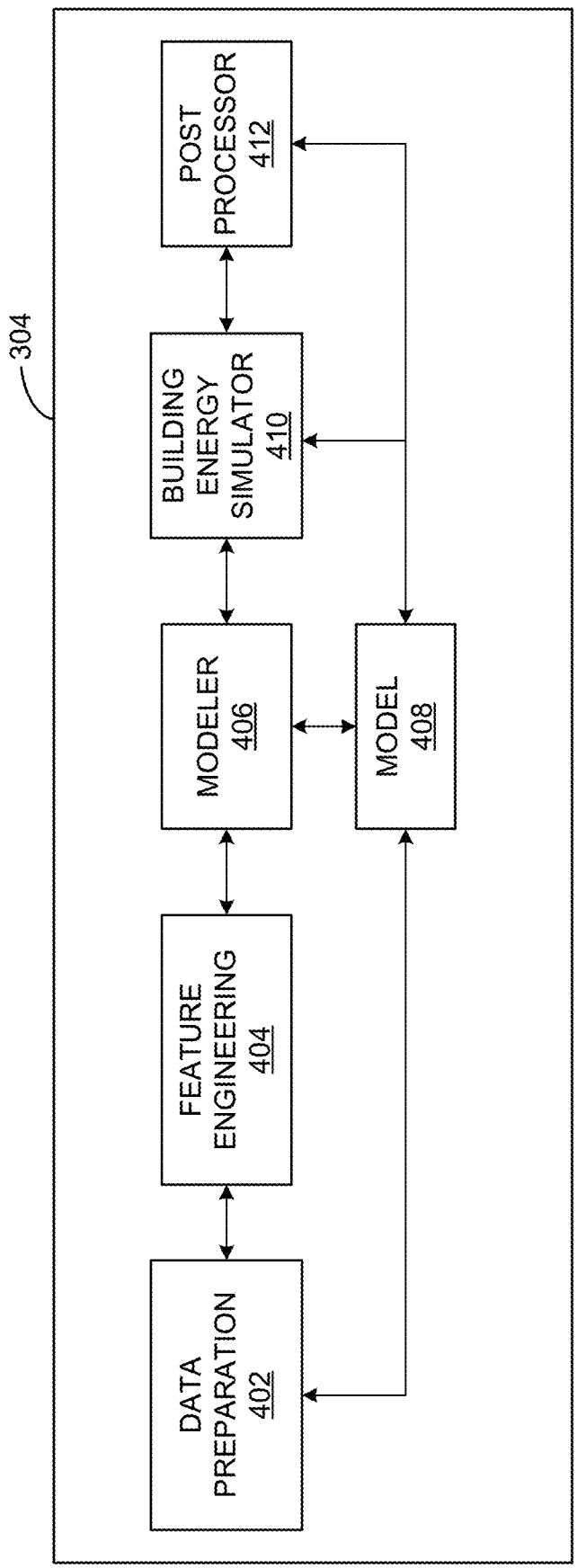
FIG. 4 illustrates an example configuration of the processor of the example of FIG. 3.

FIG. 4 illustrates an example configuration of the processor 304 for HVAC control of local HVAC controls 110-114. The example implementation of the particular processor 304 shown in FIG. 4 includes data preparation 402, feature engineering 404, a modeler 406 that produces a model 408, a building energy simulator 410, and post processing 412. Example data preparation 402 includes training data collected and cleaned and/or otherwise formatted to drive modeling and simulation. Weather data, site properties, user input, etc., can be collected and prepared for modeling and simulation by the data preparation 402, for example.

Figure 5:
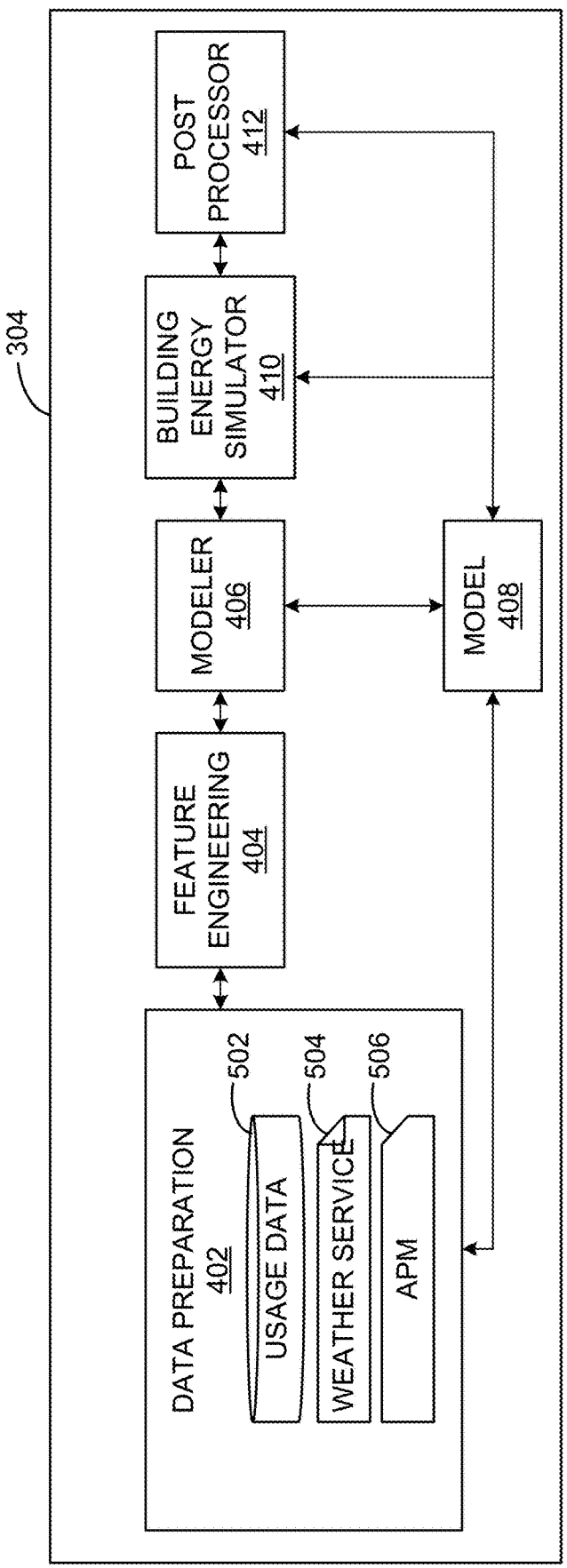
FIG. 5 illustrates an example implementation of the processor configuration of FIG. 4.

FIG. 5 illustrates an example implementation of the processor 304 configuration of FIG. 4. As shown in FIG. 5, the data preparation module 402 can include usage data 502 to drive the training data collection and cleaning. A weather service 504 can drive weather data collection. An asset performance manager (APM) 506 can facilitate site/facility properties collection, for example.

Returning to FIG. 4, feature engineering 404 processes data, such as training data, weather data, site property data, user input data, etc., to identify scenario input, user input, tuning parameter(s), etc. Using the available data, feature engineering 404 calculates features for the modeler 406. The feature engineering 404 interacts with the modeler 406 to provide features for modeling as well as receive feedback from the modeler 406 based on the model 408 and/or simulator 410 to update feature calculation, for example.

The example modeler 406 processes received features to identify parameter range(s), determine performance metric(s), etc. The modeler 406 models the available information to train the simulator 410 as well as build the simulation model 408. The modeler 406 can also interact with the building energy simulator 410 to optimize and/or otherwise improve parameters to feed back to the feature engineering 404, generate the model 408, etc.

The example building energy simulator 410 takes known physical properties of a building and returns an estimated energy usage for the site in a certain time period. For example, the simulator 410 can leverage input from the modeler 406 to generate an estimation or prediction of energy usage. An output from the simulator 410 can be processed by the post-processor 412 to be divided and/or otherwise organized into usage aspects such as daily, monthly, hourly usage, etc., as well as by load type such as lighting, fan, heat pump, electric heating, gas heating, cooling, interior lights, electric interior equipment, gas interior equipment, etc.

In certain examples, the simulator 410 can be duplicated across multiple instances for parallel processing of a plurality of simulation requests, for example. Simulated usage data can be provided to the post processor 412, model 408, modeler 406, and/or other output (e.g., a building HVAC control 110-114, etc.) in response to a simulation request (e.g., including a plurality of parameters such as 40-60 parameters, etc.). The post processor 412 can calculate an expected savings from applying select energy conservation measures (ECMs) for a particular site 102-106 via the simulator 410 and model 408, for example.

By tuning input parameters, the simulator 410 is used to model simulated energy usage closest to actual energy usage. The simulated usage can be processed by the post processor 412 to determine set points for energy savings (e.g., heating temperature set point, cooling temperature set point, etc.). The simulated usage can also be used to determine a replacement schedule and/or other time frame, workscope, etc., to replace equipment at a site 102-106, for example.

Thus, APM provides metadata regarding a site 102-106, physical properties of the site 102-106, an enterprise involving multiple sites 102-106, assets on site 102-106, and relationships between on-site assets (e.g., identity of HVAC equipment, location of HVAC equipment, HVAC distribution, HVAC schedule, HVAC efficiency, current operational setting, parameters, and/or usage, etc.), for example. APM metadata can be collected from a site 102-106 and/or users of the site 102-106, for example. Other input can include historical energy usage/consumption for one or more sites 102-106 being analyzed.

The modeler 406 takes APM input regarding actual building properties in conjunction with historical input regarding energy usage information and trains the model using the simulator 410. The modeler 406 is built using the simulator 410 through arithmetic, knowledge, etc., to form a model, digital twin, and/or other digital version of a target building 102-106 (e.g., with corresponding scale size, location, HVAC infrastructure, settings, etc.).

Given past energy usage, for example, the model 408 can be trained to use properties of the simulator 410 and/or other model to react to future conditions based on a knowledge of how the model 408 has reacted to energy use in the past. The model 408 can be trained on historical data and tuned based on historical parameter information, user input, scenario characteristics, etc., to prepare the model for deployment and simulation. Unlike a manual process, hundreds of simulations can be run in parallel between the simulator 410 and modeler 408 in minutes rather than serially waiting for other simulations to finish. Parallelization and cloud computation provide improved technology for rapid results from both preset scenarios and custom scenarios, implemented automatically from the cloud 130 to local sites 102-106, for example.

Figure 6:
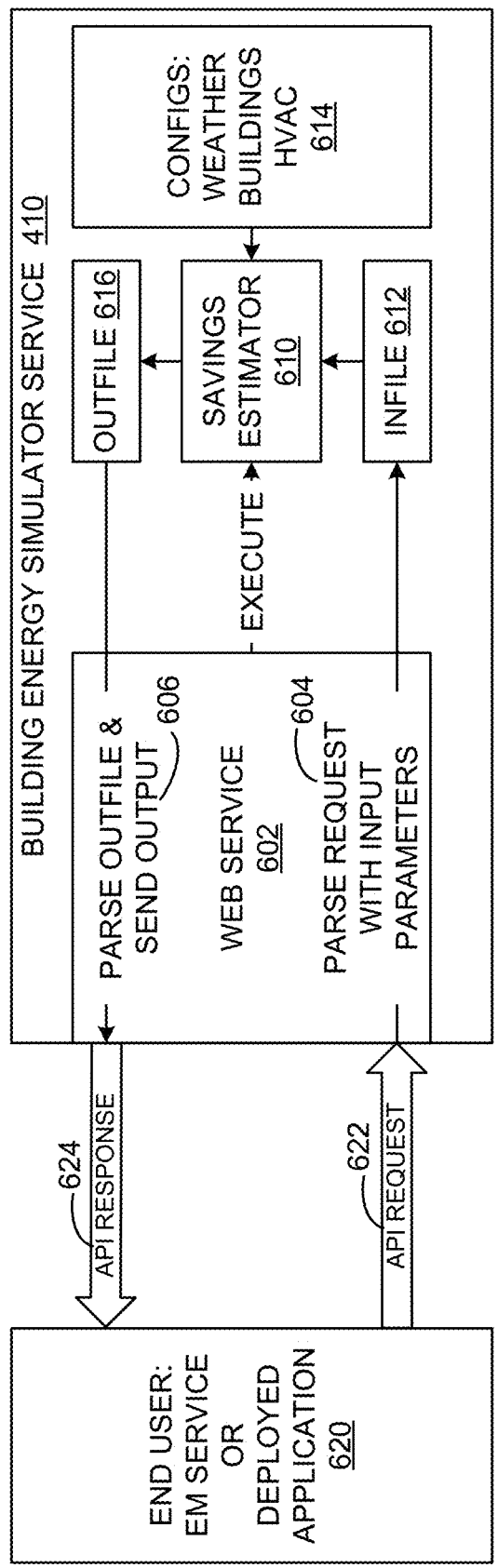
FIG. 6 illustrates an example implementation of the building energy simulator of FIG. 4.

FIG. 6 illustrates an example implementation of the building energy simulator 410. As shown in the example of FIG. 6, the simulator 410 includes a web service 602 (e.g., a Python Web Service, etc.) to parse a request 604 with input parameters (e.g., a JavaScript Object Notation (JSON) request with input parameters, etc.) and parse an output file 606 to send output (e.g., JSON output, etc.). The web service 602 triggers execution of a savings estimator binary 610 based on an input file 612 (e.g., parsed by the web service 602, etc.) and configuration information 614 (e.g., weather information, building information, HVAC information, etc.) to generate an output file 616 to be output via the web service 602, for example. The web service 602 interacts with an end user 620 (e.g., an energy management service, deployed application, etc.) via an application programming interface (API) to receive an API request 622 for HVAC parameters and provide an API response 624 with HVAC parameters and/or other estimate, guidance, setting, etc., for the end user 620, for example.

Thus, the building energy simulator 410 processes building model files (e.g., .idf files, etc.) with respect to certain conditions and parameters, etc., to generate expected energy usage and corresponding settings for facility 102-106 HVAC controls 110-114. APM information including site properties such as site identifier (SiteID), location (e.g., climate zone, address, etc.), square footage, building type, heat type, and/or other onboarding input (e.g., lighting with associated square footage, equipment with associated square footage, etc.), can be provided to the simulator 410. Such APM information can also be used to query a database including zone level information, county—climate zone mapping, climate zone building parameters, etc., to be provided to the simulator 410, for example. Weather service data and user-specified input such as lighting with associated square footage scaler, equipment with associated square footage scaler, interior infiltration, exterior infiltration, economizer type, exterior wall conductivity, roof conductivity, exterior wall solar absorptance, roof solar absorptance, air conditioning (AC) energy efficiency rate (EER), HVAC schedule(s), HVAC setpoint(s), output formal time interval, etc., can also be provided to the simulator 410. The simulator 410 uses the inputs to replace and/or otherwise override default parameters and simulate a model of the facility 102-106 being analyzed and/or otherwise monitored, for example.

By tuning input parameters, the building energy simulator 410 can model simulated energy usage closest to actual energy usage. By changing EER for assets of a site 102-106 in the simulator 410, for example, equipment replacement can be suggested to generate a highest investment saving over time. By changing HVAC heating and cooling set points in the simulator 410, a set point scenario can be generated to provide energy usage saving for one or more sites 102-106, for example.

In certain examples, the building energy simulator 410 can include an ECM simulator. Built on the EMS platform, the ECM simulator (also referred to as an ECM saving estimation tool, ECM modeling too, etc.) provides reliable, scalable, and secure processing of available data and usage models to generate ECM configurations for HVAC control 110-114 and associated savings.

Figure 7:
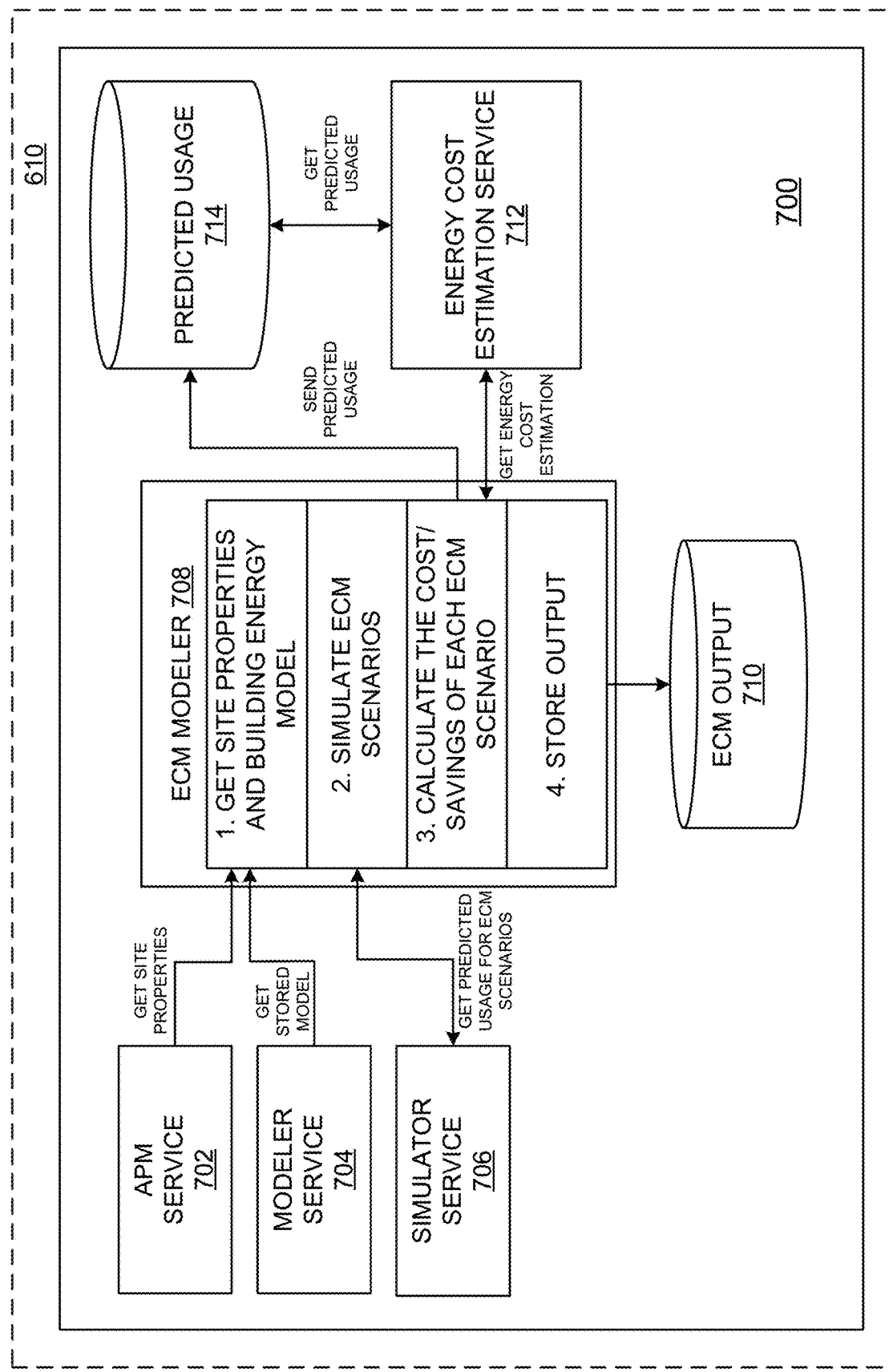
FIG. 7 illustrates an example implementation of the building energy simulator of FIGS. 4-6 including energy conservation measures simulator.

For example, as shown in FIG. 7, the savings estimator 610 can include and/or otherwise implement an ECM simulator 700 including an APM service 702, a modeler service 704, a simulator service 706, an ECM modeler 708, an ECM output 710, an energy cost estimation service 712, and a predicted usage data store 714. As shown in the example of FIG. 7, the APM service 702 receives and processes (e.g., prepares for the CM modeler 708, etc.) site 102-106 property information (e.g., received from the data preparation 402, feature engineering 404, modeler 406, etc.) such as parsed 604 by the web service 602. The modeler service 704 communicates with the modeler 406 and the stored model 408 to retrieve the model 408 for use by the ECM modeler 708 to generate predicted usage information, energy cost estimation, control settings, etc., based on the infrastructure, usage history, capabilities, etc., included in the model 408 for the site 102-106, for example. The simulator service 706 retrieves predicted usage information for one or more ECM scenarios to be executed by the ECM modeler 708.

The example ECM modeler 708 gets site properties from the APM service 702, and a building energy model from the modeler service 704. Using the site properties and building energy model, the ECM modeler 708 retrieves predicted usage information to simulate one or more ECM scenarios. Through simulation, the ECM modeler 708 can calculate the cost and savings (e.g., value) for each ECM scenario can be calculated. In certain examples, the ECM modeler 708 retrieves energy cost estimation information from the energy cost estimation service 712 to generate a value associated with each ECM scenario. The ECM modeler 708 can then send predicted energy usage information from the ECM scenarios to the predicted usage data store 714 (e.g., yearly, monthly, daily, hourly, etc.). The predicted usage information can be exchanged between the predicted usage data store 714 and the energy cost estimation service 712, for example. The ECM modeler 708 stores the usage and value output associated with each simulated scenario in the ECM output database 710. The output can be used to generate setpoints and/or other settings for the HVAC controls 110-114, for example.

In certain examples, scenario outcomes can be evaluated according to an algorithm such as a Fibonacci search, etc. For example, using a monotonic increasing/decreasing function, a maximum or minimum value can be identified. A function can then be computed at a plurality (e.g., three, five, etc.) points to determine a next interval to be evaluated, and the process continues (e.g., repeats, iterates, etc.) from that next interval until an answer is reached. Thus, rather than randomly selecting among possibilities, results are evaluated to narrow down into a subset of likely candidates, for example.

While example implementations of the energy management system and associated controllers/processors are illustrated in FIGS. 1-7, one or more of the elements, processes and/or devices illustrated in FIGS. 1-7 may be combined, divided, re-arranged, omitted, eliminated and/or implemented in any other way. Further, the example HVAC control 110-114, control center 120, and/or subcomponents thereof can be implemented by hardware, software, firmware and/or any combination of hardware, software and/or firmware. Thus, for example, any of the example HVAC control 110-114, control center 120, and/or subcomponents thereof can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example HVAC control 110-114, control center 120, and/or subcomponents thereof is/are hereby expressly defined to include a non-transitory computer readable storage device or storage disk such as a memory, a digital versatile disk (DVD), a compact disk (CD), a Blu-ray disk, etc. including the software and/or firmware. Further still, the example HVAC control 110-114, control center 120, and/or subcomponents thereof may include one or more elements, processes and/or devices in addition to, or instead of, those illustrated in FIGS. 1-7, and/or may include more than one of any or all of the illustrated elements, processes and devices.

Figure 8:
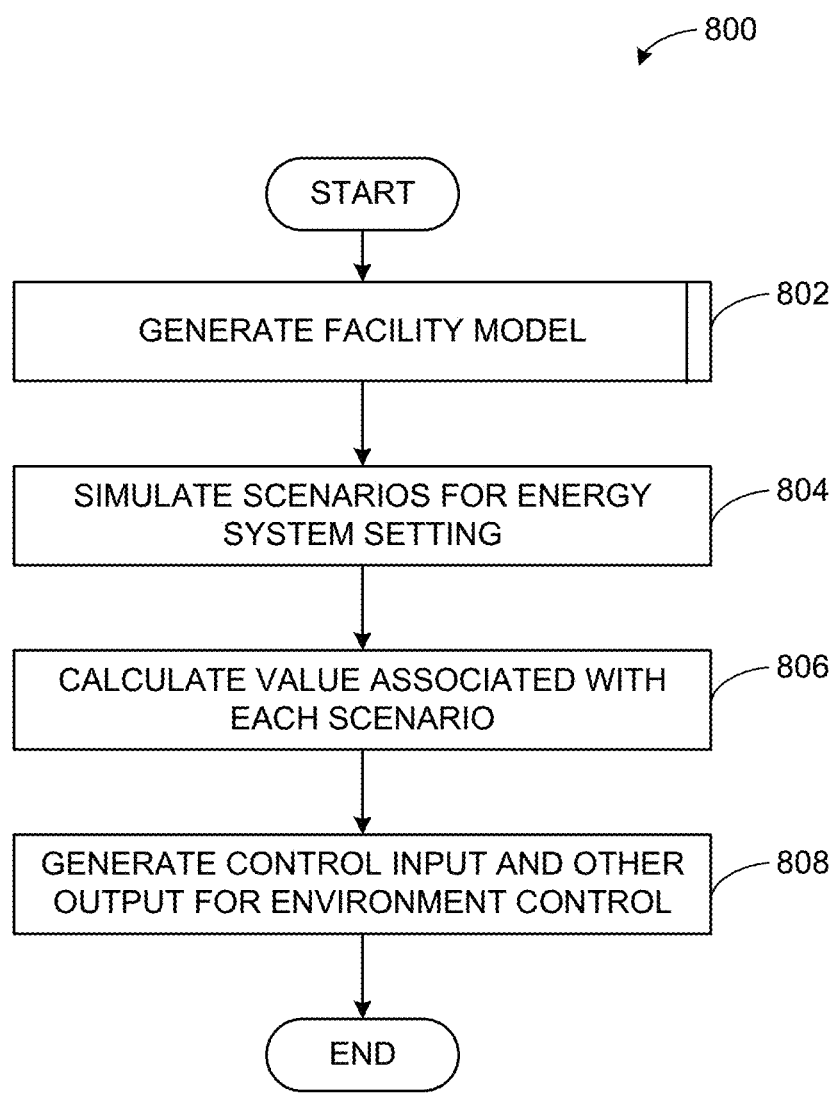
FIG. 8 illustrates a flow diagram of an example process for energy conservation measure simulation and adjustment.
Figure 9:
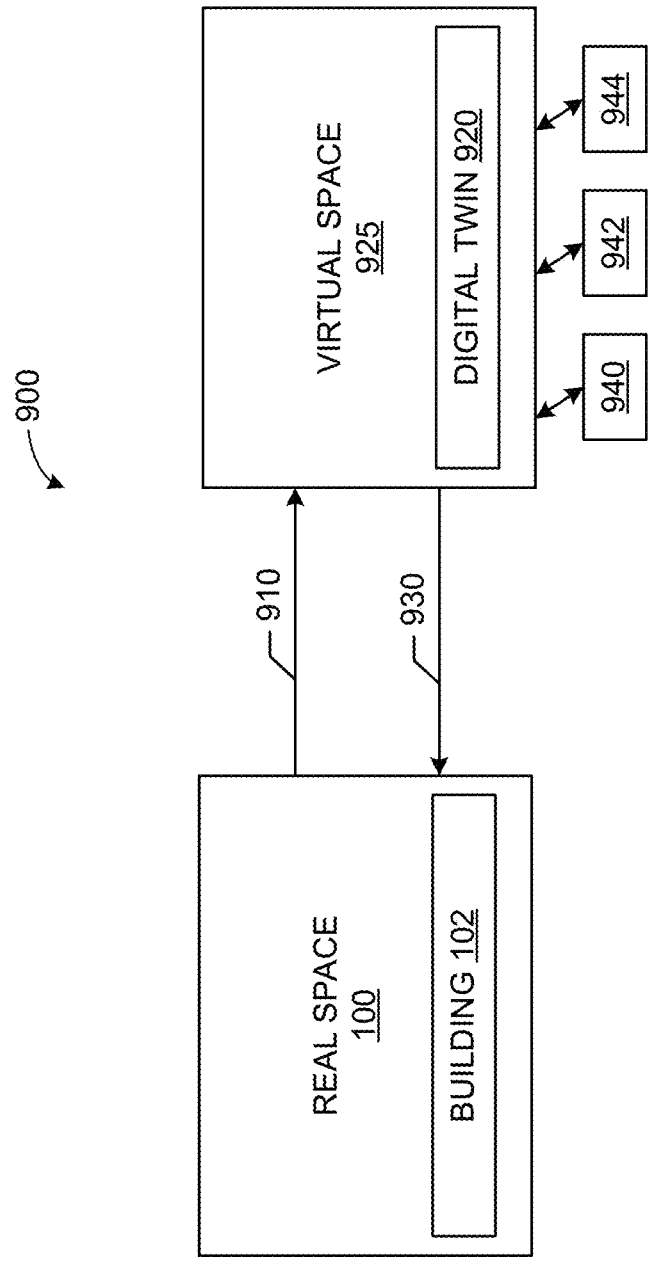
FIG. 9 illustrates an example digital twin to implement a building energy systems model.
Figure 10:
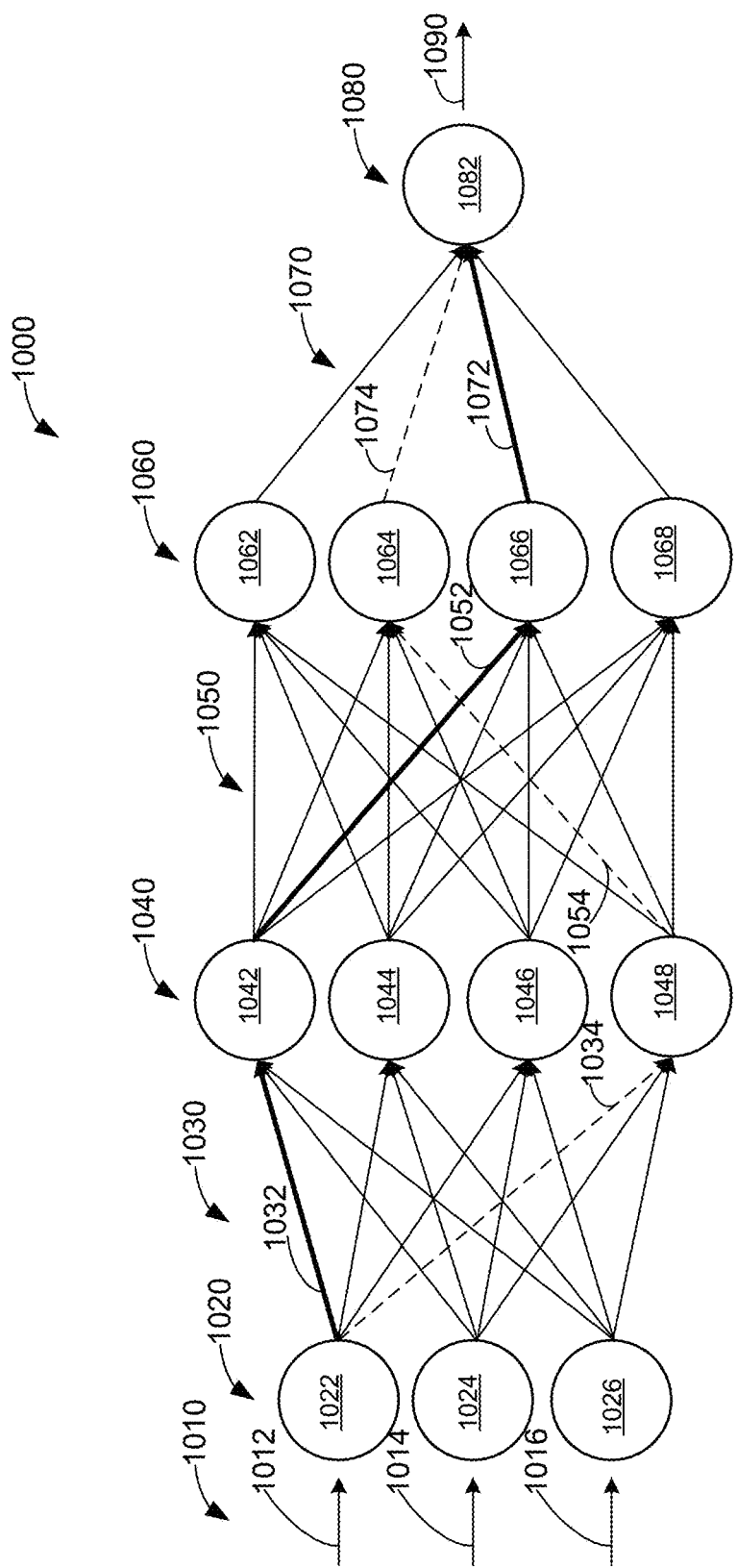
FIG. 10 illustrates an example artificial neural network to implement a building energy systems model.

Flow diagrams representative of example machine readable instructions for implementing the example HVAC control 110-114, control center 120, and/or subcomponents thereof of FIGS. 1-7 are shown in FIGS. 8-10. In these examples, the machine readable instructions comprise a program for execution by a processor such as a processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 10-13, many other methods of implementing the example HVAC control 110-114, control center 120, and/or subcomponents thereof can alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8-10 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 8 illustrates a flow diagram of an example process 800 for energy conservation measure simulation and adjustment using the HVAC control 110-114, control center 120, and/or subcomponents thereof of FIGS. 1-7. For example, the processor 304 of the cloud-based control center 120 drives modeling and simulation of each facility 102-106 of the example system 100 to generate settings, setpoints, and/or other parameters for energy conservation operation of building environmental (e.g., HVAC) systems at sites 102-106. The ECM simulation tool can be run periodically (e.g., monthly, etc.) for connected enterprises. For each enterprise, the example process 800 can be executed.

At block 802, a model of the facility 102-106 energy systems (e.g., systems controlled by the HVAC control 110-114, etc.) is generated. For example, APM service 702 information such as facility 102-106 state, average energy price, etc., HVAC control parameters, performance metrics, weather data, user input, etc., can be combined to form a model of building energy systems, usage, control, etc. The building energy model 408 can be used simulate the building system's capabilities, responses, adjustments, other infrastructure, etc., and can be applied to energy conservation scenarios to model outcome(s) of such scenario(s).

In some examples, the model is a digital twin of the building's environmental control systems. A digital representation, digital model, digital "twin", or digital "shadow" is a digital informational construct about a physical system. That is, digital information can be implemented as a "twin" of a physical device/system/person and information associated with and/or embedded within the physical device/ system. The digital twin is linked with the physical system through the lifecycle of the physical system. In certain examples, the digital twin includes a physical object in real space, a digital twin of that physical object that exists in a virtual space, and information linking the physical object with its digital twin. The digital twin exists in a virtual space corresponding to a real space and includes a link for data flow from real space to virtual space as well as a link for information flow from virtual space to real space and virtual sub-spaces. The links for data flow or information flow correspond to a digital thread that represents a communication framework between sources of data and the digital twin model. The digital thread can enable an integrated view of asset data throughout a lifecycle of the asset. For example, the digital twin model can correspond to the virtual model of the asset and the digital thread can represent the connected data flow between an asset data source and the virtual model.

For example, FIG. 9 illustrates a facility 102 in a real space 100 providing data 910 to a digital twin 920 in a virtual space 925. The digital twin 920 and/or its virtual space 925 provide information 930 back to the real space 100. The digital twin 920 and/or virtual space 925 can also provide information to one or more virtual sub-spaces 940, 942, 944. As shown in the example of FIG. 9, the virtual space 925 can include and/or be associated with one or more virtual sub-spaces 940, 942, 944, which can be used to model one or more parts of the digital twin 920 and/or digital "sub-twins" modeling subsystems/subparts of the overall digital twin 920. Thus, the digital twin 920 can represent a building's 102-106 infrastructure, and each sub-subspace 940-944 can correspond to a sub-system of that infrastructure (e.g., heating, cooling, lighting, etc.).

Sensors connected to the physical object (e.g., the facility 102, 104, 106, etc.) can collect data and relay the collected data 910 to the digital twin 920 (e.g., via self-reporting, using cloud services, etc.). An accurate digital description 920 of the facility 102 benefiting from a real-time or substantially real-time (e.g., accounting from data transmission, processing, and/or storage delay) simulation allows the simulator 410 to adapt to changing energy constraints, power availability, environmental conditions, etc., as well as conserve energy, minimize and/or otherwise reduce an effect of power shortage, etc.

Thus, rather than a generic model, the digital twin 920 is a collection of actual physics-based models reflecting the building 102 and/or its associated systems (e.g., HVAC, HVAC control 110, etc.), parameters, conditions, etc. In certain examples, three-dimensional (3D) modeling of the building 910 creates the digital twin 920 for the facility 910. The digital twin 920 can be used to view a status of the facility 102 and/or its systems based on input data 910 dynamically provided from a source (e.g., from a sensor, user, data store, other system, etc.).

In certain examples, the digital twin 920 of the facility 102 can be used for monitoring, diagnostics, and adjustment of the facility 102 and its HVAC control 110. Using sensor data in combination with historical information, current and/or potential future conditions of the facility 102 can be identified, predicted, monitored, configured, etc., using the digital twin 920. Causation, escalation, improvement, etc., can be monitored via the digital twin 920. Using the digital twin 920, the facility's 102 behaviors, parameters, etc., can be simulated and visualized for monitoring, maintenance, configuration, etc.

In contrast to computers, humans do not process information in a sequential, step-by-step process. Instead, people try to conceptualize a problem and understand its context. While a person can review data in reports, tables, etc., the person is most effective when visually reviewing a problem and trying to find its solution. Typically, however, when a person visually processes information, records the information in alphanumeric form, and then tries to re-conceptualize the information visually, information is lost and the problem-solving process is made much less efficient over time.

Using the digital twin 920, however, allows a person and/or system to view and evaluate a visualization of a situation (e.g., a building 102 and associated environmental settings, etc.) without translating to data and back. With the digital twin 920 in common perspective with the actual building 102, physical and virtual information can be viewed together, dynamically and in real time (or substantially real time accounting for data processing, transmission, and/or storage delay). Rather than reading a report, a user can view and simulate with the digital twin 920 to evaluate a condition, progression, possible change in settings, etc., for the facility 102. In certain examples, features, conditions, trends, indicators, traits, etc., can be tagged and/or otherwise labeled in the digital twin 920 to allow the user to quickly and easily view designated parameters, values, trends, alerts, etc.

The digital twin 920 can also be used for comparison (e.g., to the building 102, to a "normal", standard, or reference HVAC settings, etc.). In certain examples, the digital twin 920 of the facility 102 can be used to measure and visualize an ideal or "gold standard" value state for that building setting(s), a margin for error or standard deviation around that value (e.g., positive and/or negative deviation from the gold standard value, etc.), an actual value, a trend of actual values, etc. A difference between the actual value or trend of actual values and the gold standard (e.g., that falls outside the acceptable deviation) can be visualized as an alphanumeric value, a color indication, a pattern, etc.

Thus, the digital twin 920 can be defined as a set of virtual information constructs that describes (e.g., fully describes) the facility 102 (and/or 104, 106, etc.) from a micro level (e.g., lighting, HVAC, other system(s), etc.) to a macro level (e.g., whole floor, whole building, etc.). In certain examples, the digital twin 920 can be a reference digital twin (e.g., a digital twin prototype, etc.) and/or a digital twin instance. The reference digital twin represents a prototypical or "gold standard" model of the facility 102 or of a particular type/category of facility 102, while one or more reference digital twins represent particular facilities 102, 104, 106. Thus, the digital twin 920 of a child building or building subsystem may be implemented as a child reference digital twin organized according to certain standard or "typical" child characteristics, with a particular digital twin instance representing the particular child building 102, 104, 106/building subsystem. In certain examples, multiple digital twin instances can be aggregated into a digital twin aggregate (e.g., to represent an accumulation or combination of multiple child facilities sharing a common reference digital twin, etc.). The digital twin aggregate can be used to identify differences, similarities, trends, etc., between children represented by the child digital twin instances, for example.

In certain examples, the virtual space 925 in which the digital twin 920 (and/or multiple digital twin instances, etc.) operates is referred to as a digital twin environment. The digital twin environment 925 provides an integrated, multi-domain physics- and/or biologics-based application space in which to operate the digital twin 920. The digital twin 920 can be analyzed in the digital twin environment 925 to predict future behavior, condition, progression, etc., of the building 102, for example. The digital twin 920 can also be interrogated or queried in the digital twin environment 925 to retrieve and/or analyze current information 930, past history, etc.

In certain examples, the digital twin environment 925 can be divided into multiple virtual spaces 940-944. Each virtual space 940-944 can model a different digital twin instance and/or component of the digital twin 920 and/or each virtual space 940-944 can be used to perform a different analysis, simulation, etc., of the same digital twin 920. Using the multiple virtual spaces 940-944, the digital twin 920 can be tested inexpensively and efficiently in a plurality of ways while preserving building HVAC integrity. An operator, technician, HVAC control 110-114, etc., can then understand how the facility 102-106 may react to a variety of settings/configurations in a variety of scenarios, for example.

In some examples, the model can be an artificial neural network, such as the example network of FIG. 10, in which an input is correlated along one or more paths connecting intermediate nodes to an output (e.g., input condition(s), settings, etc., correlate to an output HVAC control configuration, etc.). For example, FIG. 10 is a representation of an example deep learning neural network 1000 that can be used to implement the patient digital twin 130. The example neural network 1000 includes layers 1020, 1040, 1060, and 1080. The layers 1020 and 1040 are connected with neural connections 1030. The layers 1040 and 1060 are connected with neural connections 1050. The layers 1060 and 1080 are connected with neural connections 1070. Data flows forward via inputs 1012, 1014, 1016 from the input layer 1020 to the output layer 1080 and to an output 1090.

The layer 1020 is an input layer that, in the example of FIG. 10, includes a plurality of nodes 1022, 1024, 1026. The layers 1040 and 1060 are hidden layers and include, the example of FIG. 10, nodes 1042, 1044, 1046, 1048, 1062, 1064, 1066, 1068. The neural network 1000 may include more or less hidden layers 1040 and 1060 than shown. The layer 1080 is an output layer and includes, in the example of FIG. 10, a node 1082 with an output 1090. Each input 1012-1016 corresponds to a node 1022-1026 of the input layer 1020, and each node 1022-1026 of the input layer 1020 has a connection 1030 to each node 1042-1048 of the hidden layer 1040. Each node 1042-1048 of the hidden layer 1040 has a connection 1050 to each node 1062-1068 of the hidden layer 1060. Each node 1062-1068 of the hidden layer 1060 has a connection 1070 to the output layer 1080. The output layer 1080 has an output 1090 to provide an output from the example neural network 1000.

Of connections 1030, 1050, and 1070 certain example connections 1032, 1052, 1072 may be given added weight while other example connections 1034, 1054, 1074 may be given less weight in the neural network 1000. Input nodes 1022-1026 are activated through receipt of input data via inputs 1012-1016, for example. Nodes 1042-1048 and 1062-1068 of hidden layers 1040 and 1060 are activated through the forward flow of data through the network 1000 via the connections 1030 and 1050, respectively. Node 1082 of the output layer 1080 is activated after data processed in hidden layers 1040 and 1060 is sent via connections 1070. When the output node 1082 of the output layer 1080 is activated, the node 1082 outputs an appropriate value based on processing accomplished in hidden layers 1040 and 1060 of the neural network 1000.

At block 804, example scenarios involving HVAC settings for energy conservation are simulated. For example, the building model 408 is used to generate one or more scenarios in which building HVAC and/or other energy systems implemented in the model 408 are simulated according to certain parameters such as HVAC set points, HVAC schedules, etc. Multiple scenarios can be formed and simulated with the model 408 by changing the simulation inputs such as the HVAC set points, HVAC schedules, etc. The scenarios can be simulated with respect to the model 408 and corresponding outcomes evaluated to identify similarities, differences, issues, etc. For example, a scenario can be simulated to evaluate whether changing an unoccupied cooling setpoint from 75F to 78F and/or changing an occupied cooling setpoint from 68F to 72F can lead to a 2% energy savings on a hot summer day, etc.

At block 806, a value associated with each simulated scenario is calculated. For example, a predicted energy usage is generated for each scenario by simulating the scenario using the model 408 and the simulator 410. The predicted energy usage can be combined with the site's average energy cost or tariff, bounded, in some examples, by a benefit of the HVAC settings (e.g., comfort, equipment and/or personnel operating environment, safety, etc.) from the scenario. Values associated with each simulated scenario can be compared to determine a scenario having the best value (e.g., lowest cost, best benefit versus cost, satisfies most constraints, etc.). Control input, settings, configuration, etc., associated with a "best value" scenario are generated by the ECM modeler 708.

At block 808, HVAC control input and/or other simulation output is generated and provided to facility HVAC control systems 110-114 by the control system 120. For example, energy values (e.g., cost vs. benefit, etc.) can be exchanged with the energy cost estimation service 712, for example. Predicted usage information can be provided to the predicted usage data store 714, for example. HVAC control settings can be transmitted via the communication interface 302 to the site HVAC control(s) 110-114 to drive HVAC settings, schedules, set points, etc., for one or more facilities 102-106, for example.

Thus, ECM simulations for an individual site 102-106 involve computationally-expensive building energy simulation. To support hundreds of enterprises with thousands of sites, a highly scalable solution is required. While prior approaches were unable to provide such computational power and scalability, certain examples provide improved technology including technological improvements to system architecture including computational power, scalability, and communicability. For example, the simulator 410 is independent and does not depend upon other services with the system. The simulator 410 executes simulations based on provided inputs and outputs predicted energy usage and associated HVAC control settings/commands. Additionally, the simulator service 410 can be deployed in a distributed configuration to the cloud 130, which allows any number of simulator 410 instances to be running at any given time, for example. When running simulations for a particular site 102-106, the ECM Simulation tool 410 leverages the system's scalability by running in parallel as many simulations as there are instances of the simulator service 410.

Figure 11:
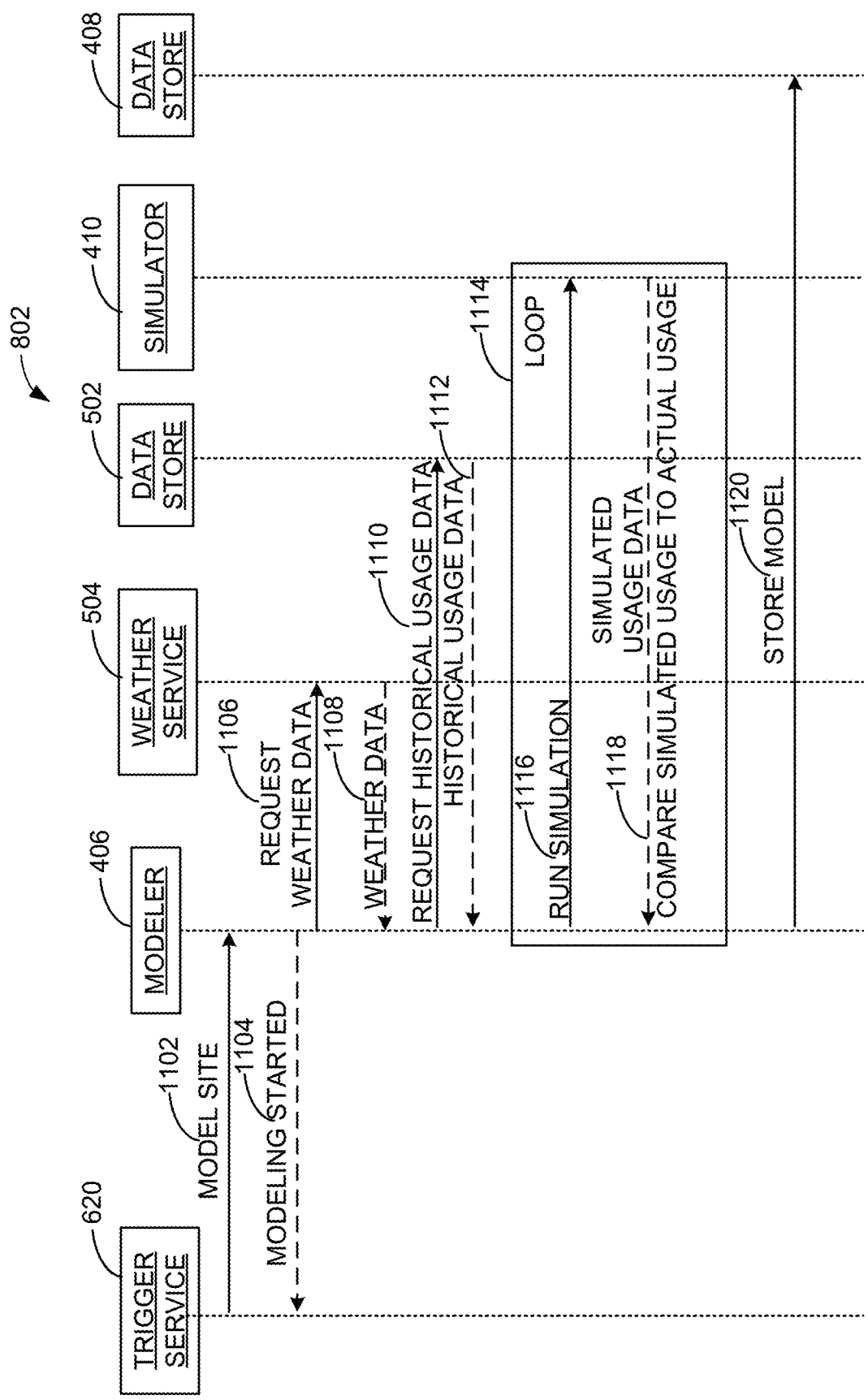
FIGS. 11 and 12 illustrate example data flow diagrams implementing portions of the process of the flow diagram of FIG. 8.

FIG. 11 illustrates an example implementation of block 802 of FIG. 8 to generate a model of facility 102-106 energy systems (and at least a portion of block 804 to simulate using the model and one or more scenarios). The example of FIG. 11 shows the data and instruction flow between the trigger service 620 (e.g., the energy management service and/or deployed application triggering an API request 622 and response 624 as in the example of FIG. 6), the modeler 406, the weather service 504, the data store 502, the simulator 410, and the model data store 408, for example. At 1102, an instruction, command, and/or request to model a site 102-106 is received by the modeler 406. At 1104, the modeler 406 acknowledges to let the service 620 know that the modeling has begun.

At 1106, the modeler requests weather data from the weather service 504, which, at 1108, returns weather data for a location corresponding to and/or otherwise near the site 102-106 being modeled to the modeler 406. The modeler 406 can use site 102-106 weather information to help craft the environment (e.g., hot, cold, rainy, snowy, windy, severe storms, etc.) in which the site 102-106 HVAC systems are operating, for example. Weather and/or other environmental conditions impact which systems operate in the facility 102-106 and at what setting(s), for example. For example, if the weather is cold, then the facility 102-106 is likely to need heat; if the weather is hot, then the facility 102-106 is likely to need cold air circulating; if the weather is warm and rainy, then the facility 102-106 is unlikely to have windows open to help alleviate heat; etc.

At 1110, the modeler 406 requests historical usage data from the data store 502. At 1112, the data store 502 transmits historical usage data for the site 102-106 to the modeler 406. For example, historical data regarding usage of systems at the site 102-106 can help to expand the model 408 and provide further context and probability for simulating the model 408 according to various scenarios.

At 1114, a simulation loop is executed by the simulator 410 to train the model 408. At 1116, the modeler 406 triggers the simulator 410 to run a simulation according to a particular scenario. The scenario can be based on weather data, historical usage data, other reference data, etc., and a response can be based on weather data, historical usage data, other reference data, etc., which informs how the model 408 of building energy systems is likely to react and have certain settings according to the given scenario, for example. For example, the modeler 406 takes APM input regarding actual building properties in conjunction with historical input regarding energy usage information and trains the model using the simulator 410. The modeler 406 is built using the simulator 410 through arithmetic, knowledge, etc., to form a model, digital twin, and/or other digital version of a target building 102-106 (e.g., with corresponding scale size, location, HVAC infrastructure, settings, etc.).

At 1118 the simulator 410 generates simulated usage data, and the simulated usage data is compared to actual usage data by the modeler 406. Given past energy usage, for example, the model 408 can be trained to use properties of the simulator 410 and/or other model to react to future conditions based on a knowledge of how the model 408 has reacted to energy use in the past. The model 408 can be trained on historical data and tuned based on historical parameter information, user input, scenario characteristics, etc., to prepare the model for deployment and simulation. Unlike a manual process, hundreds of simulations can be run in parallel between the simulator 410 and modeler 408 in minutes rather than serially waiting for other simulations to finish. Parallelization and cloud computation provide improved technology for rapid results from both preset scenarios and custom scenarios, implemented automatically from the cloud 130 to local sites 102-106, for example.

At 1120, the modeler 406 stores the updated model 408 at the model data store 408. The model 408 can then be deployed and used in further simulation to evaluate scenarios and determine HVAC control settings, for example.

Figure 12:
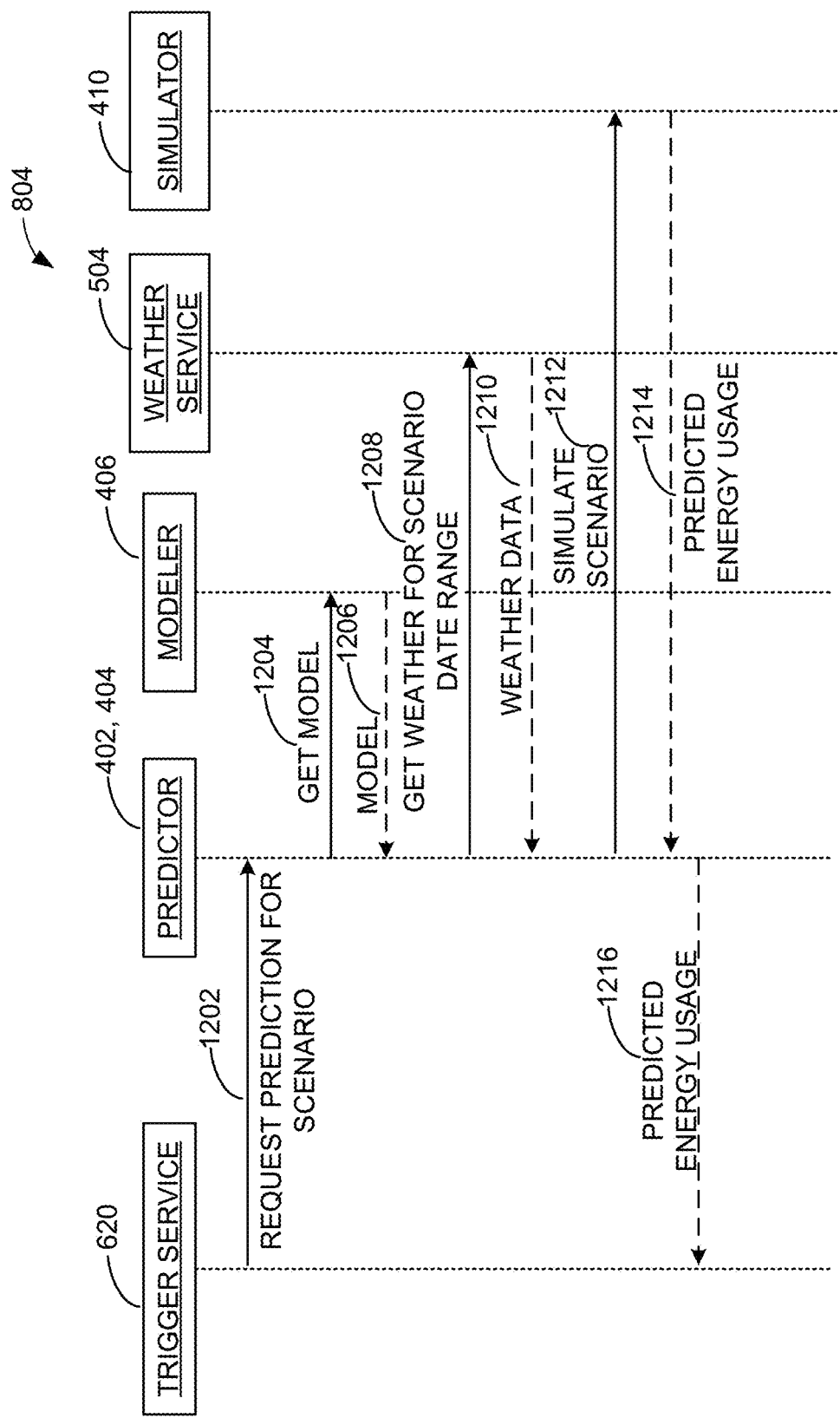

FIG. 12 illustrates an example implementation of block 804 of FIG. 8 to simulate a scenario for energy and/or other environmental system setting. The example of FIG. 12 shows the data and instruction flow between the trigger service 620 (e.g., the energy management service and/or deployed application triggering an API request and response as in the example of FIG. 6), the modeler 406, the weather service 504, the data store 502, the simulator 410, and the model data store 408, for example. The data preparation 402 and feature engineering 404 serve collectively as a "predictor" to receive, at 1202, a request from the service 620 for a prediction for a scenario. The service 620 can provide parameters for a scenario via an API request 622, for example.

At 1204, the predictor 402, 404 queries the modeler 406 for the model 408, and, at 1206, the modeler 406 provides the model 408 to the predictor. At 1208, the predictor 402, 404 queries the weather service 504 for weather data, predicted weather data, average weather data, etc., corresponding to a data range for a scenario to be simulated. For example, if the scenario is for wintertime in Cincinnati, then historical, average, and/or otherwise predicted weather data for January in Cincinnati can be requested from the weather service 504. If the scenario is for today or tomorrow, then measured, extrapolated, and/or predicted weather from current measurements and weather forecast, etc., can be requested from the weather service 504, for example. At 1210, the requested weather data is provided by the weather service 504 to the predictor.

At 1212, the predictor 402 and/or 404 triggers the simulator 410 to simulate the scenario based on the modeled weather and/or other building energy data, equipment, personnel, capability, etc. Using the model 408, the simulator 410 and its ECM modeler 708 process the model 408 using the scenario and additional information such as weather data, usage data, etc. For example, the scenario can be based on weather data, historical usage data, other reference data, etc., and a response can be based on weather data, historical usage data, other reference data, etc., which informs how the model 408 of building energy systems is likely to react and have certain settings according to the given scenario, for example.

At 1214, a predicted energy usage is provided from the simulation 410 to the predictor. Thus, simulating the model 408 under the conditions of the scenario provides an estimation and/or other indication of an energy usage by HVAC and/or other environment systems at the facility 102-106 being simulated. From the energy usage, HVAC control 110-114 settings, set points, and/or other configuration information can be extrapolated. Such system control information can be provided to the HVAC control 110-114 for the facility 102-106 being simulated, for example.

Figure 13:
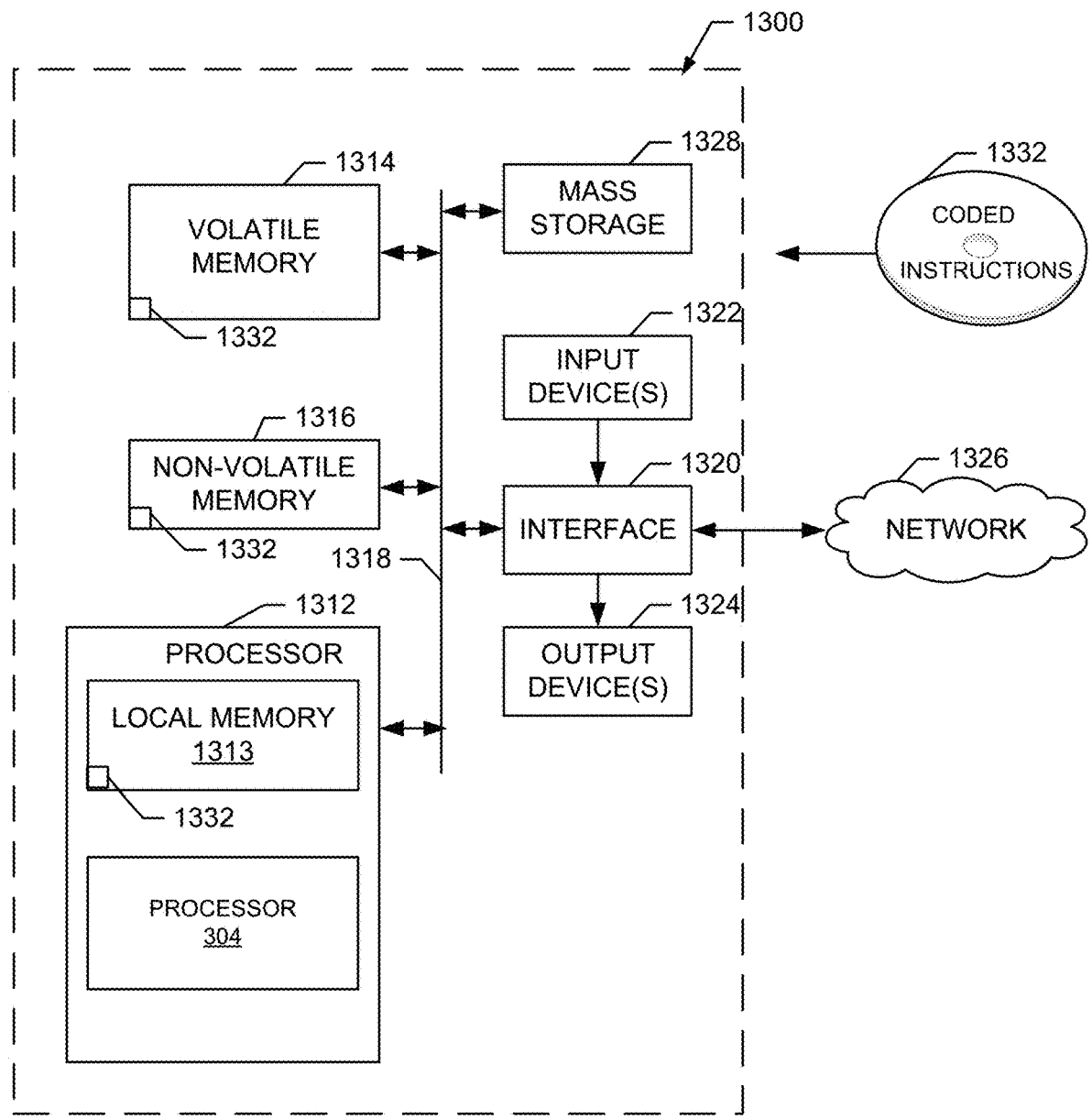
FIG. 13 is a block diagram of an example processor platform that may be used to implement the example systems and methods disclosed herein.

FIG. 13 is a block diagram of an example processor platform 1300 capable of executing the instructions of FIGS. 8, 11, and 12 to implement the example HVAC control systems of FIGS. 1-7. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIG. 13 may be stored in the mass storage device 1328, in the volatile memory 1314, in the non-volatile memory 1316, and/or on a removable tangible computer readable storage medium such as a CD or DVD.

The subject matter of this description may be implemented as stand-alone system or for execution as an application capable of execution by one or more computing devices. The application (e.g., webpage, downloadable applet or other mobile executable) can generate the various displays or graphic/visual representations described herein as graphic user interfaces (GUIs) or other visual illustrations, which may be generated as webpages or the like, in a manner to facilitate interfacing (receiving input/instructions, generating graphic illustrations) with users via the computing device(s).

Memory and processor as referred to herein can be stand-alone or integrally constructed as part of various programmable devices, including for example a desktop computer or laptop computer hard-drive, field-programmable gate arrays (FPGAs), application-specific integrated circuits (ASICs), application-specific standard products (ASSPs), system-on-a-chip systems (SOCs), programmable logic devices (PLDs), etc. or the like or as part of a Computing Device, and any combination thereof operable to execute the instructions associated with implementing the system(s) and method(s) of the subject matter described herein. For example, the control center 120 can be implemented using an embodiment of the processor platform 1300. Alternatively or in addition, the HVAC control 110-114 can be implemented using an embodiment of the processor platform 1300, for example.

Computing device as referenced herein can include: a mobile telephone; a computer such as a desktop or laptop type; a Personal Digital Assistant (PDA) or mobile phone; a notebook, tablet or other mobile computing device; or the like and any combination thereof.

Computer readable storage medium or computer program product as referenced herein is tangible and can include volatile and non-volatile, removable and non-removable media for storage of electronic-formatted information such as computer readable program instructions or modules of instructions, data, etc. that may be stand-alone or as part of a computing device. Examples of computer readable storage medium or computer program products can include, but are not limited to, RAM, ROM, EEPROM, Flash memory, CD-ROM, DVD-ROM or other optical storage, magnetic cassettes, magnetic tape, magnetic disk storage or other magnetic storage devices, or any other medium which can be used to store the desired electronic format of information and which can be accessed by the processor or at least a portion of the computing device.

The terms module and component as referenced herein generally represent program code or instructions that causes specified tasks when executed on a processor. The program code can be stored in one or more computer readable mediums.

Network as referenced herein can include, but is not limited to, a wide area network (WAN); a local area network (LAN); the Internet; wired or wireless (e.g., optical, Bluetooth, radio frequency (RF)) network; a cloud-based computing infrastructure of computers, routers, servers, gateways, etc.; or any combination thereof associated therewith that allows the system or portion thereof to communicate with one or more computing devices.

The term user and/or the plural form of this term is used to generally refer to those persons capable of accessing, using, or benefiting from the present disclosure.

Technical effects of the subject matter described above can include, but are not limited to, introducing simulation to generate energy usage and value resulting in control configuration and/or other settings driving a local HVAC control 110-114 at a site 102-106. HVAC schedules, set points, and/or other building infrastructure configuration can be driven automatically through evaluation of conditions including modeling and simulation, keeping in mind opportunities for energy conservation and value enhancement through automated technical processing systems.

In certain examples, for each scenario simulated, an amount of energy, such as kilowatt hours (kWh), is predicted as an amount of energy used by the facility 102-106 in a year given that scenario. The energy usage can be translated into a dollar amount given an energy cost for that site. The cost (and/or cost vs. benefit=value, etc.) can be compared to a current cost/value for a year, quarter, month, etc., at the facility 102-106, for example. Thus, an evaluation of savings/expensive, increased value/decreased value, etc., can be generated in association with an HVAC configuration for the HVAC control 110-114. For example, the simulator 410 can determine that adjust a set point for a building 102-106 by two degrees throughout the year will save $500 for that particular site 102-106 over a given year. Set point degrees, schedule hours, etc., can be changed in one or more combinations to determine scenarios for simulation, for example.

In certain examples, a graphical user interface (GUI) is provided to display scenario results and facilitate user interaction. For example, the GUI can show each scenario, associated results, and savings/value compared to current cost/value. In certain examples, a simulation can be triggered based on a query for cost/value, a query for a certain change in value, etc. In certain examples, pre-set scenarios are provided for automated execution, selection to trigger execution, etc. In some examples, a user can dynamically create a scenario to be modeled and simulated. For example, a user can query for cost savings if he or she shuts down a building on weekends, closes for four hours instead of seven hours, etc., and then view, evaluate, and enact associated result(s).

Certain examples provide a closed-loop tool to drive changes in HVAC and/or other building system settings to drive a desired configuration. In certain examples, a cloud-based energy management system houses the simulation and modeling tool and associated functions to change settings at local HVAC control 110-114.

While manual trial and error is inefficient, ineffective, and impractical across a large enterprise, certain examples enable value determinations across multiple scenarios to selection among HVAC control configuration options according to best cost/benefit and/or other value. Energy conservation savings can be obtained across an enterprise, at multiple sites, at a single site, etc. For example, a chain store can simulate across thousands of stores to determine a solution that provides HVAC settings to improve energy usage at most or all sites.

This written description uses examples to disclose the subject matter, and to enable one skilled in the art to make and use the invention. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A cloud-based building systems management apparatus comprising:
  a control center including a processor, the processor to execute instructions to configure the processor to generate configuration information for one or more facility environment controllers at a target building in communication with the cloud-based building systems management apparatus, the processor configured to implement at least:
    a modeler to generate a model of a target building infrastructure based on weather data, usage data, and building properties information associated with the target building;
    a building energy simulator to generate a predicted energy usage for the target building using the generated model and scenario parameters, the simulator to simulate a plurality of scenarios with respect to the model to determine configuration information for the one or more facility environmental controllers at the target building; calculate, based at least in part on the generated predicted energy usage, a value associated with each of the simulated scenarios; and to facilitate comparison of the calculated values to generate the configuration information for the one or more facility environmental controllers at the target building corresponding to a best value of the calculated values; and a communication interface to transmit the configuration information to the one or more facility environmental controllers at the target building to drive at least one setting of the one or more facility environmental controllers.

2. The apparatus of claim 1, wherein the facility environmental controller includes a heating, ventilation, and air conditioning controller for at least a portion of the target building.

3. The apparatus of claim 1, wherein the simulator is to train the model for deployment to be used in simulating the plurality of scenarios.

4. The apparatus of claim 1, wherein the simulator is to generate and output a predicted usage and an energy cost estimation for each simulated scenario.

5. The apparatus of claim 1, wherein the model includes a physics-based digital twin model of the target building and the target building infrastructure.

6. The apparatus of claim 1, wherein the configuration information is to be transmitted from the control center to a plurality of building sites.

7. The apparatus of claim 1, wherein the configuration information includes at least one of a) heating, ventilation, and air conditioning set points or b) a heating, ventilation, and air conditioning system schedule.

8. A non-transitory computer-readable storage medium including instructions which, when executed, particularly program a processor in a cloud-based control center and cause the processor to generate configuration information for one or more facility environment controllers at a target building in communication with the cloud-based control center, the processor configured to implement at least:
   a modeler to generate a model of a target building infrastructure based on weather data, usage data, and building properties information associated with the target building;
   a building energy simulator to generate a predicted energy usage for the target building using the generated model and scenario parameters, the simulator to simulate a plurality of scenarios with respect to the model to determine configuration information for the one or more facility environmental controllers at the target building; calculate, based at least in part on the generated predicted energy usage, a value associated with each of the simulated scenarios; and to facilitate comparison of the calculated values to generate the configuration information for the one or more facility environmental controllers at the target building corresponding to a best value of the calculated values; and
   a communication interface to transmit the configuration information to the one or more facility environmental controllers at the target building to drive at least one setting of the one or more facility environmental controllers.

9. The non-transitory computer-readable storage medium of claim 8, wherein the facility environmental controller includes a heating, ventilation, and air conditioning controller for at least a portion of the target building.

10. The non-transitory computer-readable storage medium of claim 8, wherein the simulator is to train the model for deployment to be used in simulating the plurality of scenarios.

11. The non-transitory computer-readable storage medium of claim 8, wherein the simulator is to generate and output a predicted usage and an energy cost estimation for each simulated scenario.

12. The non-transitory computer-readable storage medium of claim 8, wherein the model includes a physics-based digital twin model of the target building and the target building infrastructure.

13. The non-transitory computer-readable storage medium of claim 8, wherein the instructions, when, executed, cause the processor to transmit configuration information to from the cloud-based control center to a plurality of building sites.

14. The non-transitory computer-readable storage medium of claim 8, wherein the configuration information includes at least one of a) heating, ventilation, and air conditioning set points or b) a heating, ventilation, and air conditioning system schedule.

15. A computer-implemented method for configuring facility environmental controllers via a cloud-based control center, the method comprising:
   generating, using a processor, a model of a target building infrastructure based on weather data, usage data, and building properties information associated with the target building; and
   generating, using the processor, a predicted energy usage for the target building using the model and scenario parameters, the simulating including:
   simulating a plurality of scenarios with respect to the model to determine configuration information for the one or more facility environmental controllers at the target building;
   calculating, based at least in part on the generated predicted energy usage, a value associated with each of the simulated scenarios; and
   facilitating comparison of the calculated values to generate the configuration information for the one or more facility environmental controllers at the target building corresponding to a best value of the calculated values; and
   transmitting, via a communication interface, the configuration information to the one or more facility environmental controllers at the target building to drive at least one setting of the one or more facility environmental controllers.

16. The method of claim 15, wherein the facility environmental controller includes a heating, ventilation, and air conditioning controller for at least a portion of the target building.

17. The method of claim 15, further including training the model for deployment to be used in simulating the plurality of scenarios.

18. The method of claim 15, wherein the simulating a plurality of scenarios with respect to the model to determine the configuration information includes generating and outputting a predicted usage and an energy cost estimation for each simulated scenario.

19. The method of claim 15, further including transmitting the configuration information to from the cloud-based control center to a plurality of building sites.

20. The method of claim 15, wherein the configuration information includes at least one of a) heating, ventilation, and air conditioning set points or b) a heating, ventilation, and air conditioning system schedule.

* * * * *